US012587627B2

(12) United States Patent (10) Patent No.: US 12,587,627 B2
Fattal et al. (45) Date of Patent: Mar. 24, 2026

(54) METHODS AND SYSTEM OF MULTIVIEW VIDEO RENDERING, PREPARING A MULTIVIEW CACHE, AND REAL-TIME MULTIVIEW VIDEO CONVERSION

(71) Applicant: LEIA Inc., Menlo Park, CA (US)

(72) Inventors: David A. Fattal, Mountain View, CA (US); Suki Samra, Menlo Park, CA (US)

(73) Assignee: LEIA Inc., Menlo Park, CA (US)

( * ) Notice: Subject to any disclaimer, the term of this patent is extended or adjusted under 35 U.S.C. 154(b) by 0 days.

(21) Appl. No.: 18/724,875

(22) PCT Filed: Jul. 27, 2022

(86) PCT No.: PCT/US2022/038582
§ 371 (c)(1),
(2) Date: Jun. 27, 2024

(87) PCT Pub. No.: WO2023/129214
PCT Pub. Date: Jul. 6, 2023

(65) Prior Publication Data
US 2025/0071252 A1 Feb. 27, 2025

Related U.S. Application Data

(60) Provisional application No. 63/295,861, filed on Jan. 1, 2022.

(51) Int. Cl.
*H04N 13/282* (2018.01)
*H04N 13/189* (2018.01)
*H04N 13/194* (2018.01)

(52) U.S. Cl.
CPC ......... *H04N 13/282* (2018.05); *H04N 13/189* (2018.05); *H04N 13/194* (2018.05)

(58) Field of Classification Search
None
See application file for complete search history.

(56) References Cited

U.S. PATENT DOCUMENTS

| | | | |
|---|---|---|---|
| 2010/0119175 A1 | 5/2010 | Tsang | |
| 2018/0253884 A1 | 9/2018 | Burnett, III et al. | |

(Continued)

FOREIGN PATENT DOCUMENTS

| | | | |
|---|---|---|---|
| CN | 118511506 | 8/2024 | |
| EP | 3012838 B1 | 1/2018 | |

(Continued)

OTHER PUBLICATIONS

"International Application Serial No. PCT US2022 038582, International Preliminary Report on Patentability mailed Jul. 11, 2024", 7 pgs.

(Continued)

*Primary Examiner* — Christopher Braniff
(74) *Attorney, Agent, or Firm* — Schwegman, Lundberg & Woessner, P.A.

(57) ABSTRACT

Methods and system of multiview video rendering, preparing a multiview video cache, and real-time multiview video conversion employ video information having multiview frames corresponding to multiview video timestamps to generate views of a multiview frame using cache data entries of a multiview video cache corresponding to a target time stamp. The cache data entries may include a first cache data entry corresponding to a first multiview frame preceding the target timestamp and a second cache data entry corresponding to a second multiview frame following the target timestamp. The target timestamp for a particular multiview frame to be rendered may be based on a user input. The system may include a processor circuit and a memory that stores a plurality of instructions that, when executed by the processor circuit, cause the processor circuit to perform one (Continued)

or both of multiview video rendering and preparing a multiview video cache.

19 Claims, 10 Drawing Sheets

(56) References Cited

U.S. PATENT DOCUMENTS

| | | | | |
|---|---|---|---|---|
| 2019/0297258 A1* | 9/2019 | Trevor | ................. | H04N 23/698 |
| 2019/0394375 A1 | 12/2019 | Barnich et al. | | |
| 2021/0217132 A1* | 7/2021 | Mccombe | ............. | G06T 11/005 |

FOREIGN PATENT DOCUMENTS

| | | |
|---|---|---|
| TW | 201143364 | 12/2011 |
| TW | 202344044 A | 11/2023 |
| WO | WO-2021257639 A1 | 12/2021 |
| WO | WO-2023129214 A1 | 7/2023 |

OTHER PUBLICATIONS

"Taiwanese Application Serial No. 111147511, Decision of Rejection mailed Jul. 1, 2024", w English Translation, 7 pgs.

"Taiwanese Application Serial No. 111147511, Office Action mailed Nov. 16, 2023", W English Translation, 32 pgs.

"Taiwanese Application Serial No. 111147511, Reexamination Brief filed Aug. 30, 2024 to Decision of Rejection mailed Jul. 1, 2024", w English claims, 16 pgs.

"International Application Serial No. PCT/US2022/038582, International Search Report mailed Nov. 17, 2022", 3 pgs.

"International Application Serial No. PCT/US2022/038582, Written Opinion mailed Nov. 17, 2022", 5 pgs.

"Taiwanese Application Serial No. 111147511, Office Action mailed Dec. 6, 2024", W English Translation, 12 pgs.

"European Application Serial No. 22917135.0, Response to Communication pursuant to Rules 161 and 162 filed Jan. 10, 2025", 6 pgs.

"Taiwanese Application Serial No. 111147511, Response filed Feb. 10, 2025 to Office Action mailed Dec. 6, 2024", w current English claims, 14 pgs.

"European Application Serial No. 22917135.0, Extended European Search Report mailed Nov. 27, 2025", 14 pgs.

* cited by examiner

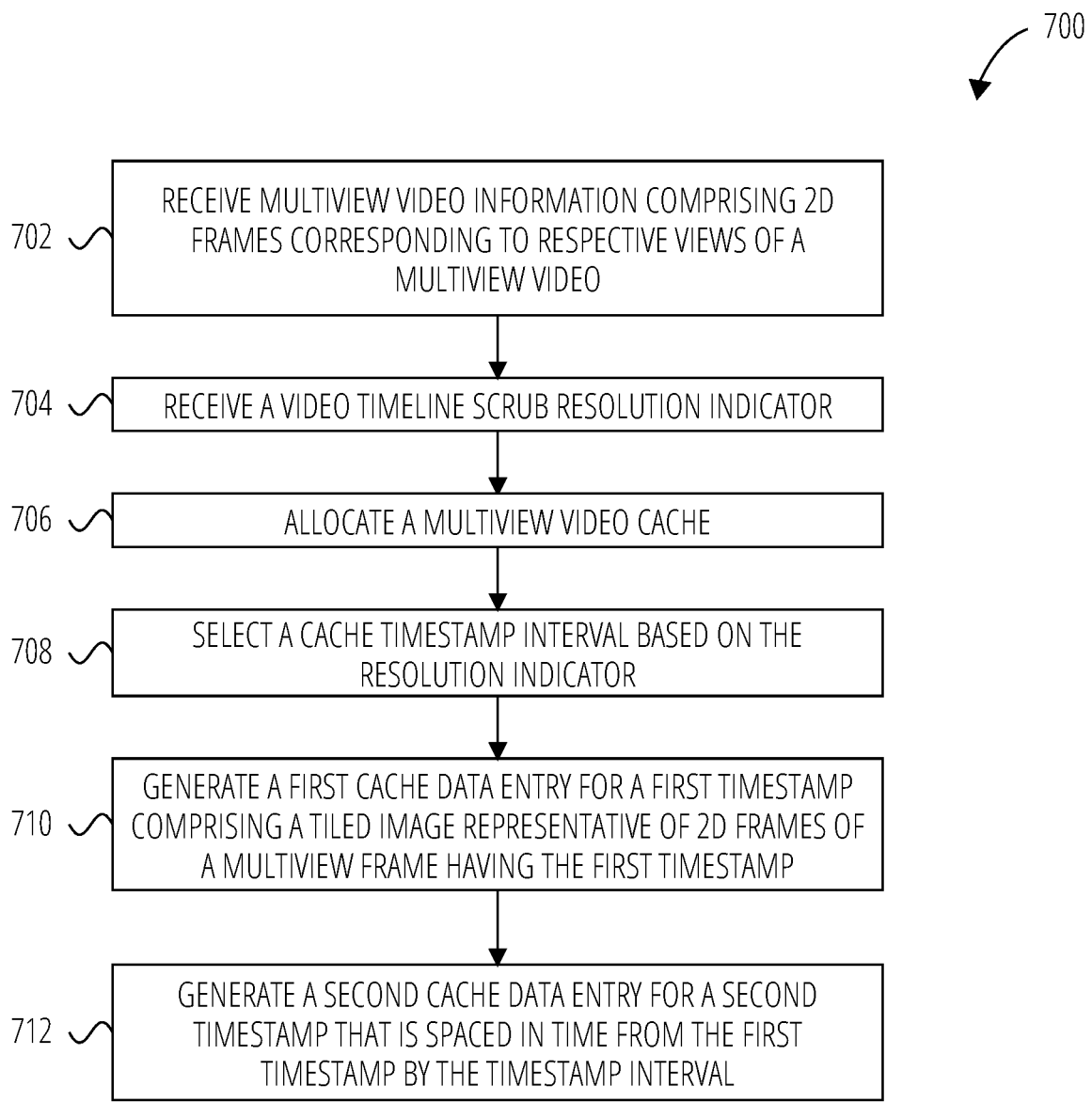

702   RECEIVE MULTIVIEW VIDEO INFORMATION COMPRISING 2D FRAMES CORRESPONDING TO RESPECTIVE VIEWS OF A MULTIVIEW VIDEO

704   RECEIVE A VIDEO TIMELINE SCRUB RESOLUTION INDICATOR

706   ALLOCATE A MULTIVIEW VIDEO CACHE

708   SELECT A CACHE TIMESTAMP INTERVAL BASED ON THE RESOLUTION INDICATOR

710   GENERATE A FIRST CACHE DATA ENTRY FOR A FIRST TIMESTAMP COMPRISING A TILED IMAGE REPRESENTATIVE OF 2D FRAMES OF A MULTIVIEW FRAME HAVING THE FIRST TIMESTAMP

712   GENERATE A SECOND CACHE DATA ENTRY FOR A SECOND TIMESTAMP THAT IS SPACED IN TIME FROM THE FIRST TIMESTAMP BY THE TIMESTAMP INTERVAL

FIG. 7

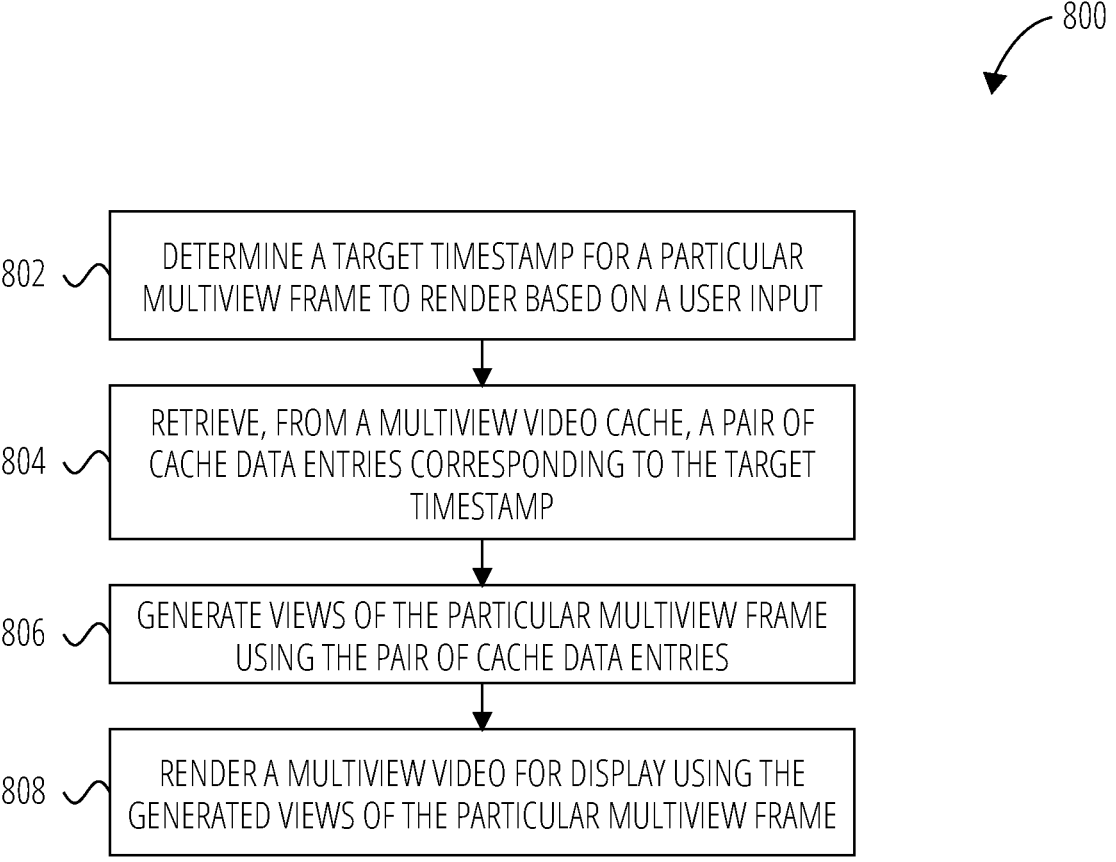

_800_

802 — DETERMINE A TARGET TIMESTAMP FOR A PARTICULAR MULTIVIEW FRAME TO RENDER BASED ON A USER INPUT

804 — RETRIEVE, FROM A MULTIVIEW VIDEO CACHE, A PAIR OF CACHE DATA ENTRIES CORRESPONDING TO THE TARGET TIMESTAMP

806 — GENERATE VIEWS OF THE PARTICULAR MULTIVIEW FRAME USING THE PAIR OF CACHE DATA ENTRIES

808 — RENDER A MULTIVIEW VIDEO FOR DISPLAY USING THE GENERATED VIEWS OF THE PARTICULAR MULTIVIEW FRAME

902    PROVIDE A TIMELINE INTERFACE

904    RECEIVE A TARGET TIMESTAMP FROM THE
TIMELINE INTERFACE

METHODS AND SYSTEM OF MULTIVIEW VIDEO RENDERING, PREPARING A MULTIVIEW CACHE, AND REAL-TIME MULTIVIEW VIDEO CONVERSION

CROSS-REFERENCE TO RELATED APPLICATIONS

This application is a U.S. National Stage Filing under 35 U.S.C. 371 from International Application No. PCT/US2022/038582, filed on Jul. 27, 2022, and published as WO 2023/129214, which claims priority to U.S. Provisional Patent Application Ser. No. 63/295,861, filed Jan. 1, 2022, the entirety of each of which are incorporated by reference herein.

STATEMENT REGARDING FEDERALLY SPONSORED RESEARCH OR DEVELOPMENT

N/A

BACKGROUND

A video stream includes a series of frames, where each frame may be made up of a two-dimensional (2D) image. Video streams may be compressed according to a video coding specification to reduce the video file size alleviating network bandwidth. A video stream may be received by a computing device from a variety of sources. Video streams may be decoded and rendered for display by a graphics pipeline. The rendering of these frames at a particular frame rate produces a display of video.

Emerging display technologies such as holographic displays, three-dimensional (3D) displays, volumetric displays, lightfield displays, and other like displays may provide a more immersive viewing experience than conventional 2D video display. Techniques to convert 2D video into different formats may involve pre-preprocessing efforts before the video can be rendered.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIG. 7 illustrates a flowchart of a method for generating a multiview video cache according to an embodiment consistent with the principles described herein.

FIG. 8 illustrates a flowchart of a method for using information from a multiview video cache according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to create and use a multiview video cache. Among other benefits, the cache can help reduce latency and thereby improve user experience with video timeline search, sometimes referred to as "timeline scrubbing," during playback of multiview video using a multiview display. Embodiments are directed to generating and populating a multiview video cache with cache data entries that correspond to respective different multiview video timestamps. Each cache data entry can include copies of two-dimensional (2D) frames for a particular timestamp in the multiview video. According to an embodiment, the cache can be generating by pre-processing the multiview video.

According to embodiments, a multiview video rendering system can be configured to receive an indication of a target timestamp for a particular multiview frame to render, for example, based on a user input indicating a timestamp of a particular time in a multiview video. A pair of cache data entries corresponding to the target timestamp can be retrieved from the multiview video cache and the cache data entries can be used together to generate a multiview frame corresponding to the target timestamp. The pair of cache data entries corresponding to the target timestamp can include an entry that is nearest in time preceding the target timestamp and another entry that is nearest in time following the target timestamp. A graphics pipeline can receive image information from the cache data entries, blend the image information, and thereby generate a new multiview frame for display. Processing efficiencies are realized by storing image information for multiple different views of a multiview image in a single data element or data location such that multiple frame data accesses can be avoided. Further processing efficiencies can be realized by combining or blending information from multiple different cache data entries substantially in real-time rather than establishing a new echo buffer each time a new target timestamp is indicated for playback.

Figure 1:
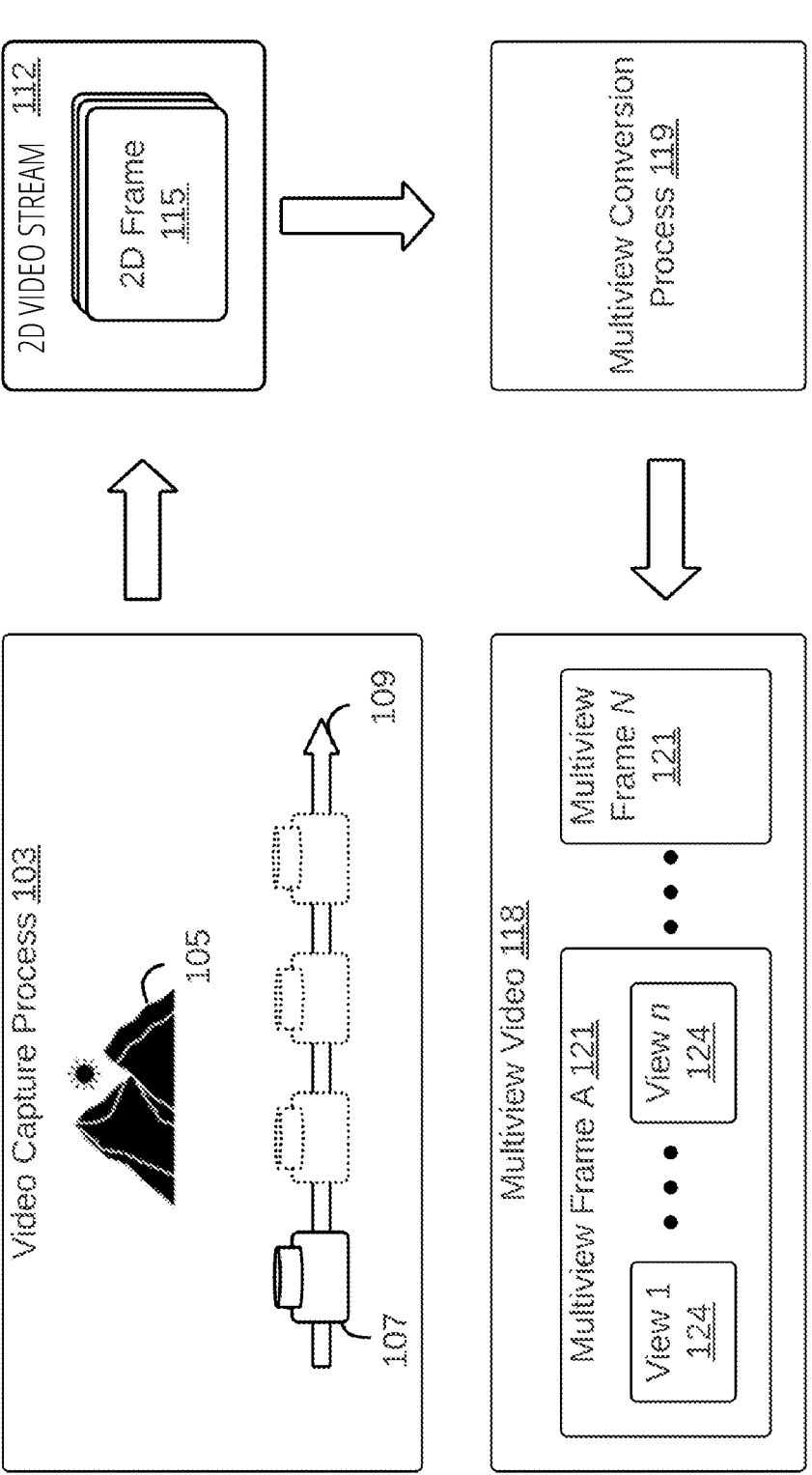
FIG. 1 provides an overview of a process for generating multiview video according to an embodiment consistent with the principles described herein.

FIG. 1 provides an overview of a process for converting a two-dimensional (2D) video stream into multiview video according to an embodiment consistent with the principles described herein. A video capture process 103 involves capturing video of a scene 105. A scene 105 may be a physical arrangement of objects that are of interest to a viewer. The video capture process 103 may take place in a studio or any other physical environment. The goal is to visually capture the scene 105 using a camera 107. A camera 107 may capture video, where the video is made up of a series of time-sequenced images (referred to as frames). The camera may move along a particular direction 109 with respect to the scene to capture different angles of the scene 105. The direction 109 may be primarily linear or orbital to obtain different viewing angles of the scene.

The camera 107 may be attached to a vehicle that moves with respect to the scene 105. The vehicle may be a drone or other unmanned aerial vehicle (UAV). In some examples, the scene 105 may include one or more objects set on turntable that rotates with respect to a stationary camera 107. The video capture process 103 ultimately transforms the visual details of a scene that occupies physical space into a 2D video stream 112. The 2D video stream may be made up a series of time-sequenced, 2D frames 115. Each 2D frame 115 represents a single view of the scene at a particular point in time. Time may be recorded as a timestamp that is specific to a corresponding 2D frame. Rendering the 2D frames in sequence at a target frame rate results in 2D video perceived by a viewer.

While the 2D video stream 112 is described as video of a physical scene, it should be appreciated that the 2D video stream 112 may be generated by moving a virtual camera with respect to a 3D model. For example, gaming engines and other 3D model generators may allow for the creation of 2D video by applying a virtual camera (defined in terms of a location and a direction) to a 3D model (e.g., a volumetric model of a scene defined in terms of a point cloud, surface mesh, texture map, etc.).

The camera 107 may transmit or otherwise upload the 2D video stream to a repository via a network. The repository may include a memory storage, a server, a cloud-based storage, or other computing system that is configured to receive and store video files. The network may include the Internet, an intranet, a wireless network, a wired network, or any other network that facilitates the flow of data. The 2D video stream 112 may be coded according to a particular coding format. Coding involves applying a lossy or lossless compression to reduce the file size to accommodate the network bandwidth. The video coding format may be, for example, an H.264 format, an H.265 format, any format specified by the Moving Picture Experts Group (MPEG), etc. In addition, the 2D video stream 112 may be packetized for transmission over an Internet Protocol (IP) network.

A multiview video 118 may be generated from the 2D video stream 112 using a multiview conversion process 119. The multiview conversion process 119 is a computer-implemented process that converts the 2D video stream into multiview video 118 that may be rendered for display. The multiview conversion process 119 may be implemented as a software program, routine, or module executable by a processor. The multiview conversion process 119 may receive the 2D video stream 112 as a compressed, packetized data stream. For example, the multiview conversion process 119 may use an Application Programming Interface (API) or other function call to retrieve the 2D video stream 112 from the repository. The 2D video stream may be live video such that the video capture process 103 transmits the 2D video stream as it is capturing video of the scene 105 and where the 2D video is streamed to a computing system that implements the multiview conversion process. In some embodiments, the 2D video stream 112 includes pre-recorded (not live) video that is configured to be streamed to a computing device upon request.

The multiview video 118 may be stored in memory as one or more computer files or formats. The multiview video 118 comprises a series of multiview frames 121 depicted as multiview frame A through multiview frame N. Multiview frames 121 can have respective timestamps and are displayed in time sequence at a specified frame rate (expressed as a frame rate per second (FPS)). Thus, a multiview frame 121 comprises a multiview image. Each multiview frame 121 is made up a plurality of views 124. For example, multiview frame A is depicted as having view 1 through view n, which may similarly apply to each multiview frame 121 in the multiview video 118. In some embodiments, when rendered on a multiview display, each view 124 of a multiview frame 121 corresponds to a respective principle angular direction at a surface normal with respect to the multiview display. As a result, multiple different views 124 can be perceived contemporaneously by a viewer. This results in a three-dimensional (3D) output image or lightfield image content. A pictorial example of a multiview display and different view directions is provided in FIG. 4.

According to an embodiment, the scene 105 can be captured or recorded by multiple cameras 107 concurrently and from different view directions. The multiview frames 121 of the multiview video 118 can accordingly be provided directly based on the captured image content and without the multiview conversion process 119 described above for native 2D content.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the perspective of the user. In particular, the different views may represent different perspective views of a particular multiview frame 121.

Herein a 'timestamp' is defined as a value indicating a relative or absolute time in any unit of time (e.g., seconds, date/time, etc.). Each frame (e.g., each multiview frame, or each 2D frame that comprises a multiview frame) may include a timestamp to organize the frames in a time series. According to an embodiment, the multiview frames of the multiview video 118 comprise a multiview video program when rendered in sequence according to the timestamps.

As used herein, the article 'a' is intended to have its ordinary meaning in the patent arts, namely 'one or more'. For example, 'a processor' means one or more processor and as such, 'the memory' means 'one or more memory components' herein.

A multiview display may be implemented using a variety of technologies that accommodate the presentation of different image views so that they are perceived contemporaneously. One example of a multiview display is one that employs diffraction gratings to control the principle angular directions of the light comprising the different views. According to some embodiments, the multiview display may be a lightfield display, which is one that presents a plurality of light beams of different colors and different directions corresponding to different views. In some examples, the lightfield display is a so-called 'glasses free' three-dimensional (3D) display that may use diffractive gratings to provide autostereoscopic representations of multiview images without the need for special eye wear to perceive depth. In some embodiments, the multiview display may require glasses or other eyewear to control which views are perceived by each eye of the user.

Figure 10:
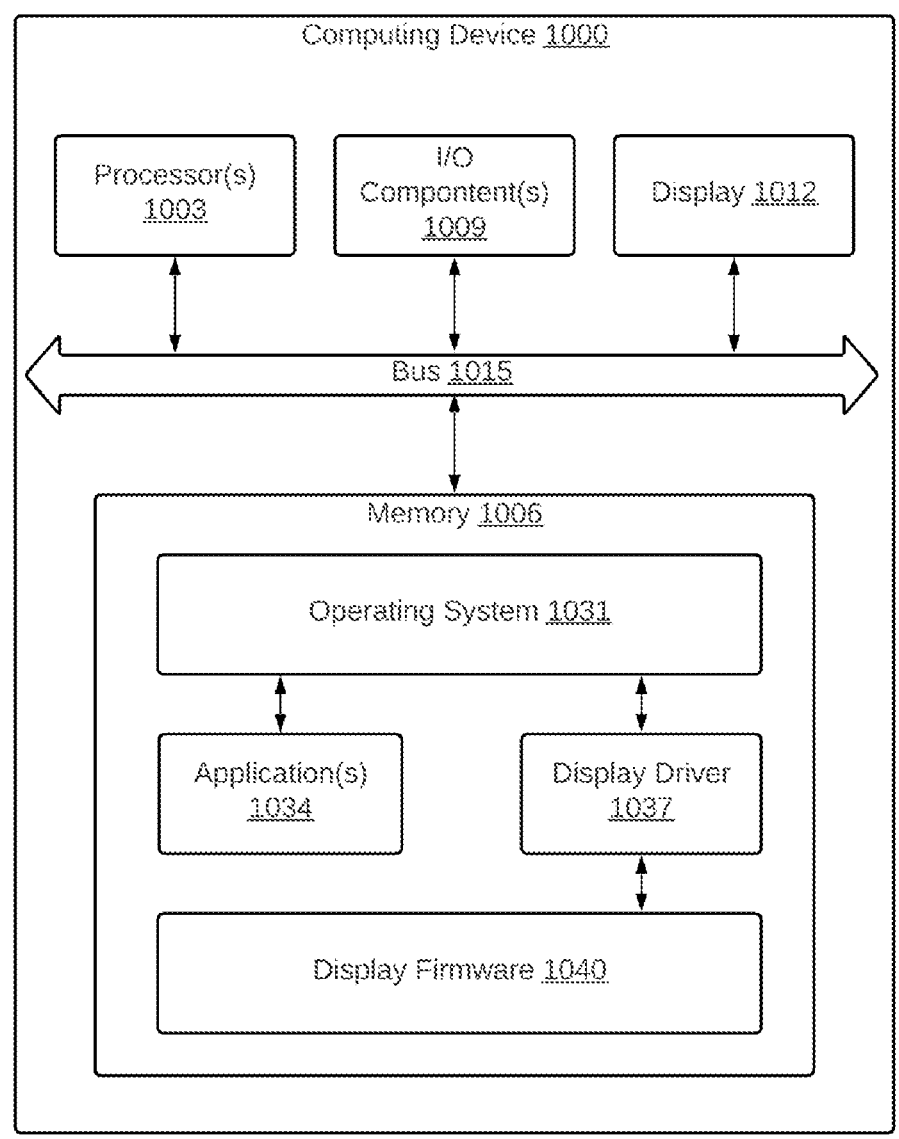
FIG. 10 illustrates a schematic block diagram of a computing device configured to perform real-time multiview video conversion in an example, according to an embodiment consistent with the principles described herein.

Embodiments of the principles described herein are directed to a computer-implemented method of multiview video rendering. The computer-implemented method of multiview video rendering may be alternatively characterized as a computer-implemented method of multiview image cache generation and usage. The computer-implemented method of multiview video rendering may be configured to reduce latency in timeline scrub operations, according to some embodiments. FIG. 10, which is discussed in further detail below, provides an example of a computing device configured to one or both of implement the computer-implemented method of multiview video rendering or utilize a multiview image cache generated by the computer-implemented method of multiview video rendering.

According to various embodiments, the computer-implemented method of multiview video rendering. comprises receiving video information having a plurality of multiview frames using a computing device. Each multiview frame of the multiview frame plurality in the received video information corresponds to a respective multiview video timestamp and comprises a plurality of two-dimensional (2D) frames corresponding to different views of a scene within the multiview frame.

The computer-implemented method of multiview video rendering further comprises determining a target timestamp for a particular multiview frame to render based. In various embodiments, the particular multiview frame may be determined based on a user input. The computer-implemented method of multiview video rendering further comprises retrieving from a cache (e.g., a multiview video cache) a pair of cache data entries corresponding to the target timestamp. A first cache data entry of the pair of cache data entries retrieved from the cache comprises a respective first image frame group corresponding to a first multiview frame preceding the target timestamp and a second cache data entry of the pair of cache data entries comprises a respective second image frame group corresponding to a second multiview frame following the target timestamp. In some embodiments, retrieving the pair of cache data entries from the cache includes identifying two cache data entries from the cache having timestamps that are nearest in time to the target timestamp.

The computer-implemented method of multiview video rendering further comprises generating views of the particular multiview frame using the first and second image frame groups from the cache and rendering a multiview video for display by the computing device, the multiview video comprising the views of the particular multiview frame.

In some embodiments, the computer-implemented method of multiview video rendering may further comprise generating the cache with cache data entries corresponding to respective different timestamps. Generating the cache include selecting fewer than all multiview frames of the video information. Generating the cache may further include populating the cache with cache data entries corresponding to respective different multiview video timestamps. In particular, generating the cache with cache data entries corresponding to respective different timestamps may include at least one of the cache data entries comprising an image frame group representing fewer than all of the views of a corresponding multiview frame. Further still, each cache data entry can include copies of the 2D frames for a particular respective multiview frame timestamp. According to some embodiments, a number of cache data entries for a particular multiview video program may be at least an order of magnitude less than a number of multiview frames in the received video information.

In various ones of these embodiments, each cache data entry may comprise a tiled image having tiles that each correspond to a different 2D frame of a respective multiview frame. In some embodiments, the tiles in a tiled image may comprise a copy of the corresponding 2D frame itself. In other embodiments, the tiles in a tiled image may comprise a lower-resolution copy of a corresponding 2D frame from the video information. In some embodiments, the cache data entries in the cache may have non-time-adjacent timestamps. In some embodiments, a number of the cache data entries in the cache may be based on a timeline scrubbing resolution. In some embodiments, generating the cache includes using 2D frames corresponding to fewer than all of the multiview frames of the video information.

In other embodiments, the computer-implemented method of multiview video rendering may further comprise generating the cache with cache data entries corresponding to respective different timestamps. In these embodiments, at least one of the cache data entries may comprise an image frame group representing fewer than all of the views of a corresponding multiview frame.

In some embodiments, generating views of the particular multiview frame includes using a virtual camera. In some embodiments, generating the views of the particular multiview frame includes generating a respective view using 2D frames from each of the first and second cache data entries that correspond to the particular multiview frame. In some of these embodiments, generating the respective view comprises blending information from the 2D frames from each of the first and second cache data entries. Blending the information may include weighting an influence of each of the 2D frames proportional to a time difference of each of the cache data entries relative to the target timestamp, for example.

Other embodiments of the principles described herein are directed to a computer-implemented method of preparing a multiview video cache. The computer-implement method of preparing a multiview video cache comprises receiving multiview video information comprising two-dimensional (2D) frames by a computing device. According to various embodiments, each 2D frame corresponds to a respective view of a multiview video and corresponding to a multiview video timestamp. The computer-implement method of preparing a multiview video cache further comprises populating the cache with cache data entries corresponding to respective different multiview video timestamps. Each cache data entry comprises copies of the 2D frames for a particular respective timestamp. In some embodiments, the cache data entries correspond to non-time-adjacent multiview video timestamps. In some embodiments, at least one of the cache data entries comprises fewer than all of the 2D frames from the video information for a particular timestamp.

In some embodiments, computer-implemented method of preparing a multiview video cache further comprises generating a first cache data entry of the cache corresponding to a first timestamp. In these embodiments, the first cache data entry comprises a tiled image and tiles of the tiled image correspond to respective ones of the copies of the 2D frames for the first timestamp. In some embodiments, the tiles may be lower-resolution copies of the 2D frames for the first timestamp.

Yet other embodiments of the principles described herein are directed to using the multiview video cache. Using the multiview video cache can include retrieving, from the cache, a pair of cache data entries corresponding to a target timestamp. First and second cache data entries of the pair can comprise respective first and second image frame groups, and the first image frame group corresponds to a first multiview frame nearest in time and preceding the target timestamp and the second image frame group corresponds to a second multiview frame nearest in time and following the target timestamp. Using the multiview video cache can further include generating a multiview frame using the information from the first and second image frame groups, for example, by blending information from each of the frame groups to generate a new multiview image frame for the target timestamp.

Figure 2:
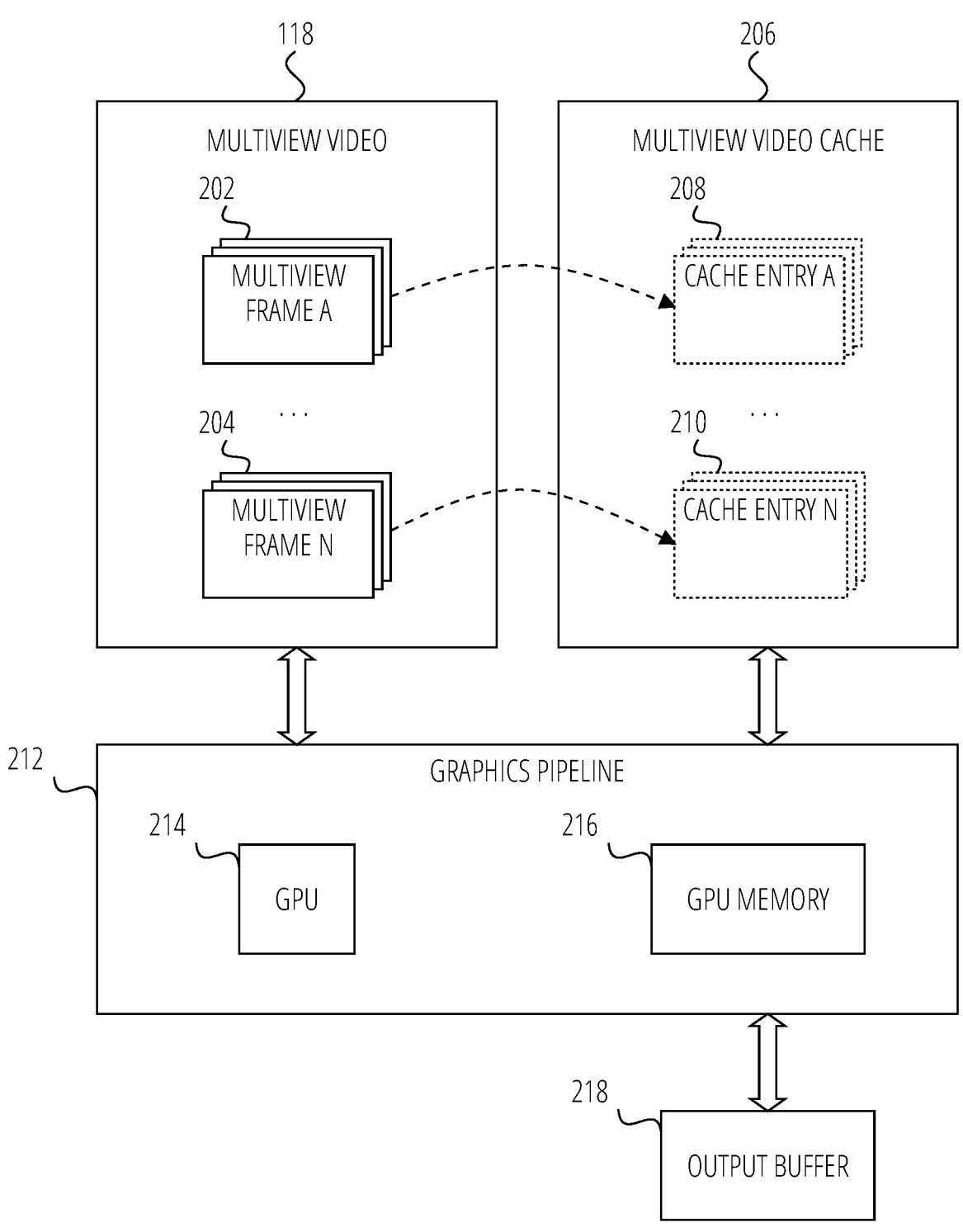
FIG. 2 illustrates an example of a multiview video and corresponding multiview video cache according to an embodiment consistent with the principles described herein.

FIG. 2 illustrates the multiview video 118, a multiview video cache 206, a graphics pipeline 212, and an output buffer 218. The multiview video 118 can include a plurality of multiview video frames having respective timestamps. Together, the multiview frames of the multiview video 118 comprise a portion of a multiview video program when rendered in sequence according to the timestamps. In the example of FIG. 2, the multiview video 118 includes a first multiview frame, or multiview frame A 202 corresponding to a first timestamp, a last multiview frame, or multiview frame N 204 corresponding to an Nth timestamp, and some number of other multiview frames having respective time-stamps between the first and Nth timestamps.

According to an embodiment, the multiview video cache 206 can be populated with multiple cache data entries. Each cache data entry can include a group of images, or an image frame group, having a particular timestamp. For example, a group of images can correspond to different 2D views of a multiview frame for the particular timestamp. Generally, the timestamp of a particular cache data entry corresponds to a timestamp for a particular frame of the multiview video 118. There can be, however, fewer cache data entries in the multiview video cache 206 than there are multiview frames in the multiview video 118. In other words, fewer than all of the frames in the multiview video 118 may correspond to data entries in the multiview video cache 206. Various attributes of a cache data entry, such as cache entry A 208 or cache entry N 210, are further discussed below in the example of FIG. 3.

According to an embodiment, particular frames of the multiview video 118 can be selected for use or inclusion in one or more image frame groups and stored in the multiview video cache 206. A number of the multiview video 118 frames selected for use in the multiview video cache 206, and the timestamp difference between adjacent image frame groups in the multiview video cache 206, can influence a timeline scrubbing resolution. For example, for greater resolution timeline scrubbing, relatively more frames of the multiview video 118 can be selected for inclusion in the multiview video cache 206. A greater resolution timeline scrubbing thus refers to a multiview video cache 206 that includes more cache data entries, or image frame groups, relative to an overall number of program timestamps, than a lower resolution timeline scrubbing would have for the same number of program timestamps. Generally, the cache data entries can have timestamps that are relatively evenly dis-tributed (e.g., periodically) throughout the timeline of the multiview video 118, however, other distributions of image frame groups can be used. For example, cache data entries may be more concentrated around program content of great-est interest to a viewer.

The multiview video cache 206 may be defined as an address space that is part of a memory space that is accessed by a processor circuit. The processor circuit can be a generic processor that executes instructions, supports an operating system, and provides applications (e.g., user-level applica-tions). The memory circuit may be system memory that is accessible to an operating system or applications that execute on a computing device. The computing device may include a graphics pipeline 212 that can receive video frame information, for example, from the multiview video 118 or the multiview video cache 206.

A 'graphics pipeline,' as used herein, is defined as a computer-implemented environment that renders image data for display. The graphics pipeline 212 may include one or more graphics processing units or GPUs 214 or other specialized processing circuits that are optimized for ren-dering image content to a screen. For example, a GPU 214 may include vector processors that execute an instruction set to operate on an array of data in parallel. The graphics pipeline 212 can include a graphics card, graphics drivers, or other hardware and software used to render graphics. The graphics pipeline 212 may be configured to render images on a multiview display. The graphics pipeline 212 may map pixels onto corresponding locations of a display and control the display to emit light to display a rendered image. The graphics pipeline 212 may also include a GPU memory 216. The GPU memory 216 may include one or more memory devices used by the graphics pipeline 212.

In some embodiments, the graphics pipeline 212 is a subsystem that is separate from one or more other processor circuits of the computing device. In some embodiments, the graphics pipeline 212 is implemented purely as software by the processor circuit. For example, the processor circuit may execute software modules that operate as the graphics pipe-line 212 without specialized graphics hardware. In some embodiments, portions of the graphics pipeline 212 are implemented in specialized hardware while other portions are implemented as software modules.

The graphics pipeline 212 may be used for decoding a video stream to extract video frames in the GPU memory 216. For example, the graphics pipeline 212 may decode a 2D or 3D video stream to identify frames according to a coding format. For example, in the MPEG coding format, frames may be formatted as an I-frame, P-frame, B-frame, etc. The graphics pipeline 212 may store the decoded frames in the GPU memory 216. These decoded 2D frames may then be loaded into an output buffer 218, such as using a frame dumping process. While FIG. 2 shows a graphics pipeline 212 that can perform decoding and frame extrac-tion, it should be appreciated that a dedicated hardware or software decoder may be used to load frames into the output buffer 218 after decoding.

Figure 3:
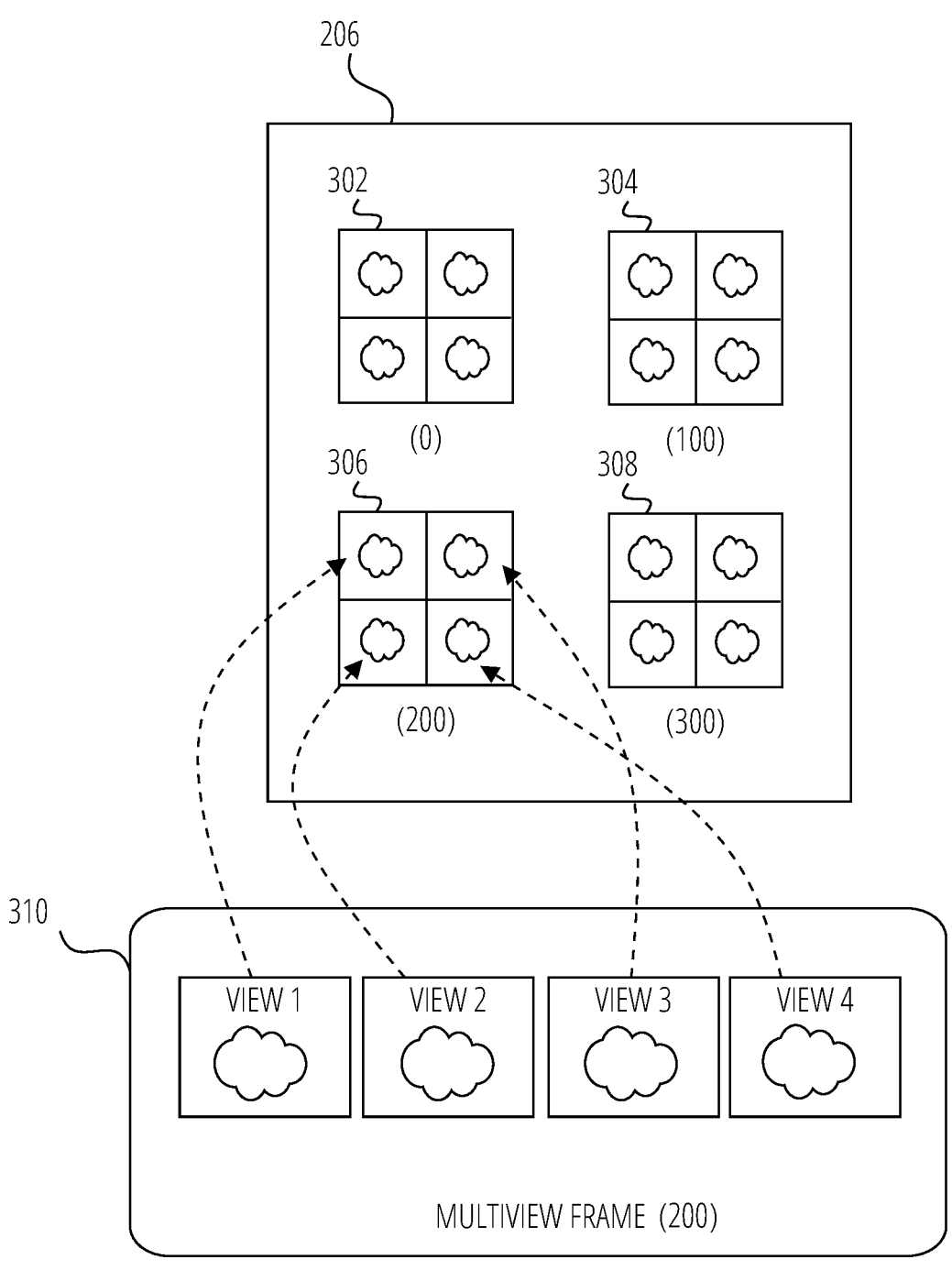
FIG. 3 illustrates an example of a multiview frame and corresponding multiview video cache data entries according to an embodiment consistent with the principles described herein.

FIG. 3 illustrates an example of the multiview video cache 206 according to an embodiment consistent with the prin-ciples described herein. The multiview video cache 206 can include multiple cache data entries having respective differ-ent timestamps corresponding to different portions of a multiview video.

In the example of FIG. 3, the multiview video cache 206 includes a first cache data entry 302 having a timestamp of 0, a second cache data entry 304 having a timestamp of 100, a third cache data entry 306 having a timestamp of 200, and a fourth cache data entry 308 having a timestamp of 300. Additional or fewer cache data entries can similarly be used in the multiview video cache 206, such as depending on a desired timeline scrubbing resolution. The first through fourth cache data entries of the multiview video cache 206 are periodically spaced one hundred (100) timestamp units apart. Other periodic or non-periodic spacing between cache data entries can similarly be used. The specific timestamp values discussed herein are representative or notional values selected for illustration.

According to an embodiment, each cache data entry in the multiview video cache 206 includes a group of images having the same timestamp. For example, the group of images can correspond to different views or 2D frames from the same multiview frame. FIG. 3 illustrates graphically a particular multiview frame 310 corresponding to timestamp 200 and its relationship to the third cache data entry 306. The particular multiview frame 310 includes four discrete and separate frames or views (e.g., 2D view 1 through 2D view 4) that correspond to different view directions at timestamp 200. According to an embodiment, a copy of each of view 1 through view 4 from the multiview frame 310 can be included in the third cache data entry 306.

The group of images in a cache data entry can be stored in various configurations or formats. According to an embodiment, the images in each group can be combined to form a macro-image, and the macro-image can be stored as the cache data entry, such as in an image file format. According to a further embodiment, a macro-image can include an image comprised of multiple tiled images. For example, the third cache data entry 306 can be a macro-image in an image file format, and the macro-image includes multiple tiles that respectively correspond to the views in the particular multiview frame 310. According to the embodiment of FIG. 3, each cache data entry comprises a different macro-image of four tiled images. Additional or fewer tiled images can similarly be used. The number of tiles can depend, for example, on the number of views in the multiview frames to be cached.

According to an embodiment, to further reduce a size of a cache data entry, a number of tiles in a particular cache data entry can be less than a number of views in the multiview video. In this embodiment, any "absent" tile can be generated, for example, by applying interpolation to, or blending information from, the other tiles in the particular cache data entry. Other techniques, such as using a virtual camera, can similarly be used to generate tile information.

According to an embodiment, the copies of the views from the particular multiview frame 310 can be lower-resolution copies of the source multiview frame. That is, a resolution of the image, or macro-image, stored in a cache data entry can be lower than its corresponding source image. Accordingly, a cache data entry for the multiview frame 310 can comprise less data than the multiview frame 310. In another embodiment, a cache data entry for the multiview frame 310 can comprise less data than one view of the multiview frame 310.

Combining views into a tiled macro-image can be convenient in terms of compute time and other resource handling. However, other cache data entry configurations can be used. For example, different image files for a particular cache data entry can be stored at consecutive cache memory addresses. In another example, a particular cache data entry can include a reference image and a vector map defining the view images for a particular timestamp. Other techniques can similarly be used.

Figure 4:
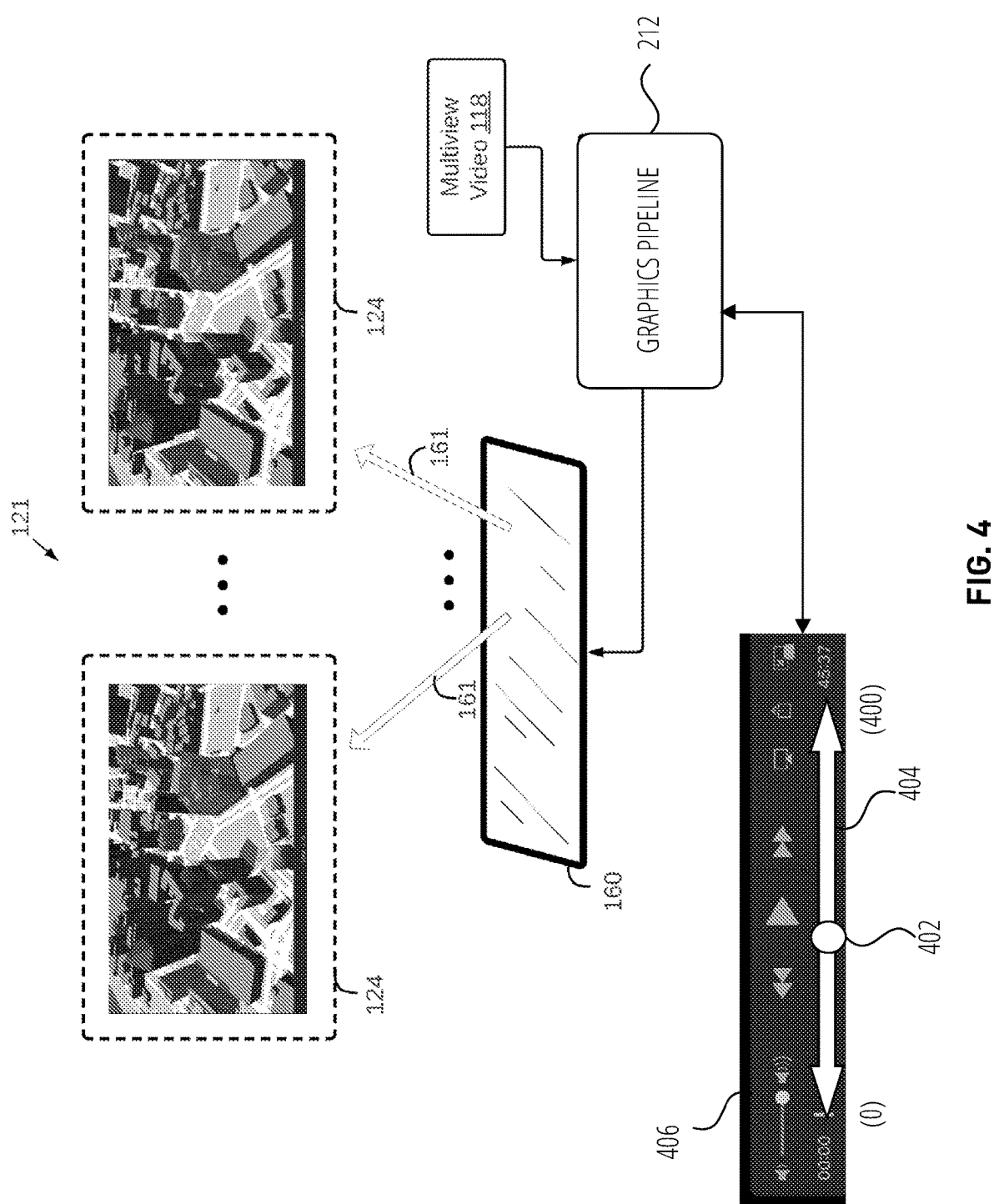
FIG. 4 illustrates an example of rendering a multiview video for display according to an embodiment consistent with the principles described herein.

FIG. 4 illustrates an example of rendering a multiview video for display according to an embodiment consistent with the principles described herein. For example, FIG. 4 depicts an example of rendering the multiview video 118 for display, the multiview video 118 comprising multiview frames 121, and each multiview frame comprising a respective set of different views 124 (e.g., view 1 through view 4 in the example of a four-view multiview display).

The example of FIG. 4 includes a user interface 406 that can be used to communicate with or provide instructions to the graphics pipeline 212, and in turn the graphics pipeline 212 can use the multiview video 118 and/or information from the multiview video cache 206 to prepare a viewable output.

As discussed above, an application may provide multiview video conversion that generates a multiview video comprising multiview frames 121 and can optionally include or use a multiview frame generated using one or more cache data entries from the multiview video cache 206. Upon generating the multiview video, the application may interface with the graphics pipeline 212 to render the multiview video comprising multiview frames 121 on a multiview display 160. The graphics pipeline 212 may map each view 124 of each multiview frame 121 to a corresponding pixel location on the multiview display 160. As a result, each view 124 may correspond to a respective principle angular direction 161.

The user interface 406 can include a timeline 404 representative of a duration of the multiview video 118. According to an embodiment, the user interface 406 can be configured to receive a user input that indicates a target timestamp 402 on the timeline 404 at which to begin playback. According to some embodiments, a user can search or "scrub" the timeline 404 by moving the target timestamp 402 to any location along the timeline 404. Information about the target timestamp 402 can be provided to the graphics pipeline 212 and, in response, the graphics pipeline 212 can identify the multiview frame or frames needed to begin playback at or near the target timestamp 402. In some embodiments, a relatively long latency can be introduced between user input to the user interface 406 and a resulting output from the multiview display 160 if the graphics pipeline 212 acquires multiple, full-resolution image frames to establish sufficient content in the output buffer 218. According to embodiments discussed herein, the latency can be reduced using information from multiple cache data entries in the multiview video cache 206, where the multiple cache data entries are those nearest in time (e.g., preceding and following) to the target timestamp 402.

While FIG. 4 provides one example of a multiview display 160 and user interface 406, other implementations may be used to display multiview images or receive user input. For example, some implementations may require special eyeglasses to perceive different views, or other pictorial representations of the timeline 404 can be used.

Figure 5:
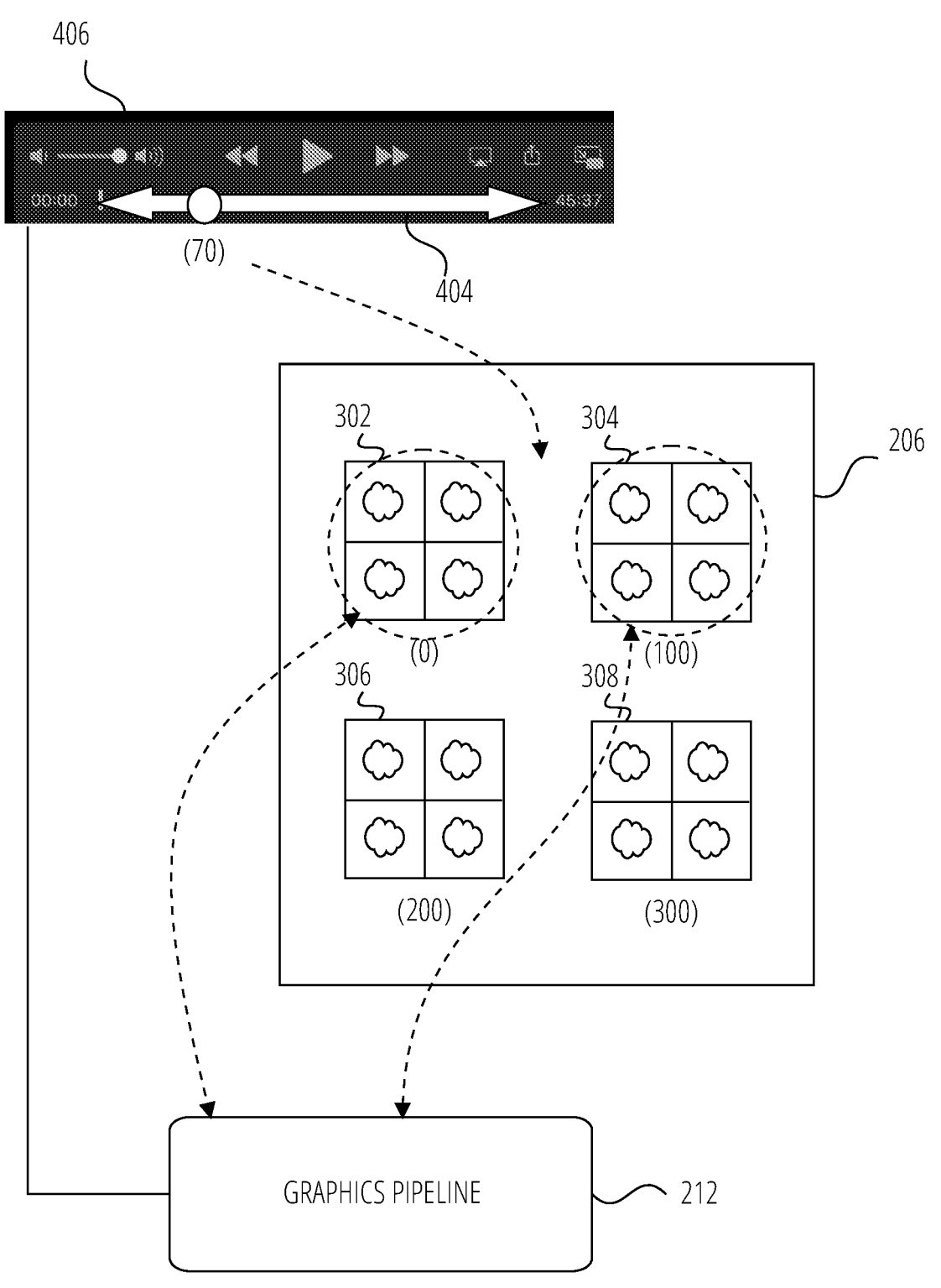
FIG. 5 illustrates an example of using a multiview video cache according to an embodiment consistent with the principles described herein.

FIG. 5 illustrates an example of using the multiview video cache 206 according to an embodiment consistent with the principles described herein. In the example of FIG. 5, a user input can indicate a timeline scrub to a target timestamp of 70. The graphics pipeline 212 can receive information about the target timestamp and access cache data entries from multiview video cache 206 to initiate multiview video conversion or playback of a multiview video stream that begins at, or is perceived by a user to begin at, the target timestamp.

The multiview video cache 206 may or may not include a cache data entry for the target timestamp of 70. In the example of FIG. 5, the multiview video cache 206 does not include a cache data entry with timestamp 70. Accordingly, a pair of cache data entries corresponding to the target timestamp can be selected by the graphics pipeline 212. The graphics pipeline 212 can select the first cache data entry 302 having timestamp 0 because it is nearest in time preceding the target timestamp of 70, and the graphics pipeline 212 can select the second cache data entry 304 having timestamp 100 because it is nearest in time following the target timestamp of 70. The first cache data entry 302 can comprise a first image frame group that corresponds to a first multiview frame preceding the target timestamp and the second cache data entry 304 can comprise a second image frame group that corresponds to a second multiview frame following the target timestamp.

Multiview video conversion using the cache data entries includes generating new multiview frame views from the images in the first cache data entry 302 and the second cache data entry 304. For example, each view of the new multiview frame is generated from a portion of each of the macro-images stored in the pair of cache data entries. The portion can include or represent at least a pair of 2D frames that are timestamp-adjacent (or nearest in time) to the target timestamp.

Figure 6:
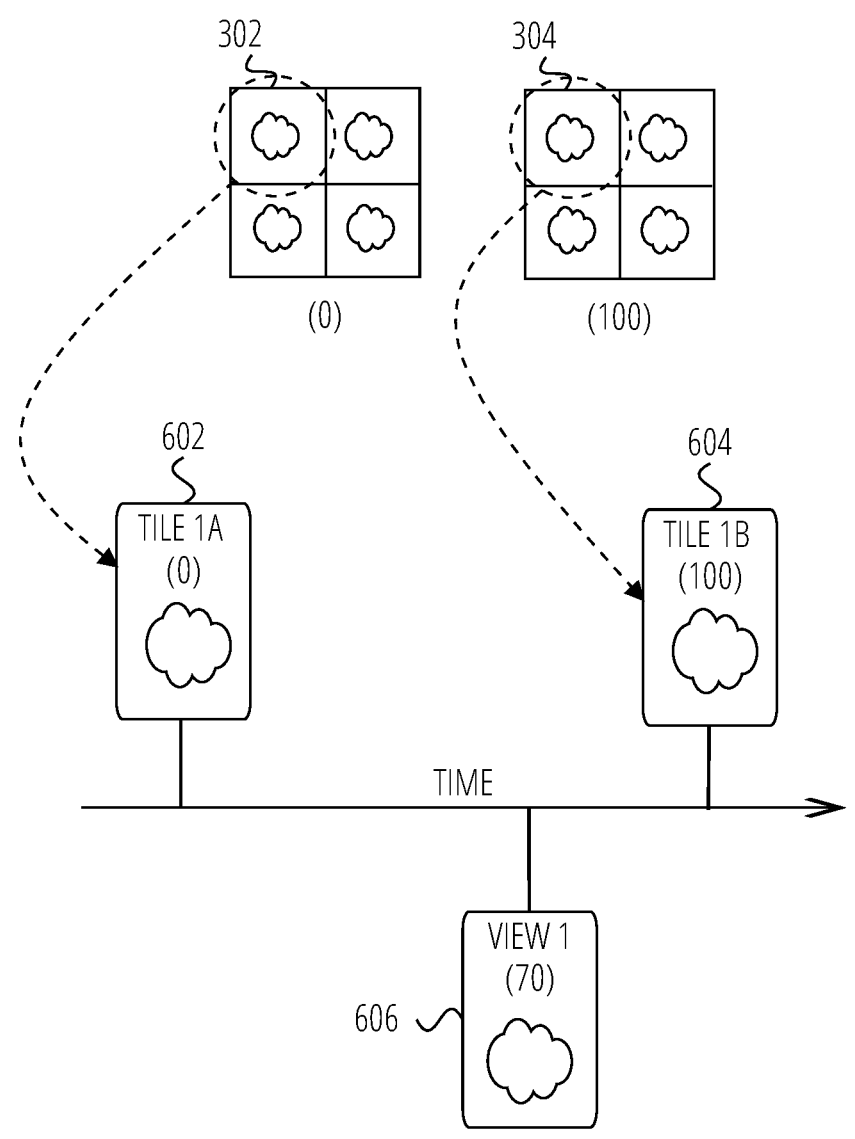
FIG. 6 illustrates an example of blending information from multiple cache data entries according to an embodiment consistent with the principles described herein.

For example, to generate a first view, or view 1, the target timestamp is 70 units of time. Each of the first cache data entry 302 and the second cache data entry 304 includes a macro-image comprising tiles that correspond to view 1 but at timestamps preceding and following the target timestamp 70, respectively. FIG. 6 illustrates pictorially a first tile 602 that is a portion of the macro-image stored as the first cache data entry 302, and a second tile 604 that is a portion of the macro-image stored as the second cache data entry 304. In FIG. 6, the tiles are designated alphanumerically with the first character indicating the corresponding view (e.g., view 1, 2, 3, or 4) and the second character indicating the corresponding cache data entry (e.g., "A" for the first cache data entry 302, "B" for the second cache data entry 304, and so on). In the example of FIG. 6, each of the first tile 602 and the second tile 604 corresponds to a top-left position of the respective macro-image in the cache, however, different tile or image positions or arrangements can similarly be used.

The graphics pipeline 212 can receive the first tile 602 (TILE 1A) and the second tile 604 (TILE 1B) and can use the tile information together to generate a first new view 606 that corresponds to the target timestamp of 70 for the first view direction (VIEW 1). Similarly, the graphics pipeline 212 can generate a different new view, such as for the second view direction (VIEW 2) at timestamp 70, using a tile 2A from the first cache data entry 302 and a tile 2B from the second cache data entry 304, and so on. The new generated views can provide to the graphics pipeline 212 initial conditions, such as depth information, for use in a new (or "scrubbed") playback stream that effectively begins at the target timestamp.

According to an embodiment, the new views can be generated by combining or otherwise using together the tiles from the cache data entries. For example, a new view can be generated by blending the image portions. In some embodiments, the blending may be a linear blending or interpolation. In other embodiments, the blending may be motion-based blending. The blending may include a pixel-by-pixel blending operation. Examples of generating a new view from different image portions using a blending operation is further described below.

According to an embodiment, multiview video conversion may also include rendering a multiview video for display, the multiview video comprising the newly generated views based on the cache data entries. For example, upon generating new views, the views may be formatted into multiview frames for multiview video in a predefined video format.

FIG. 6 provides an example of the first new view 606 that is generated by blending a subset of image portions. In particular, FIG. 6 illustrates an example of performing a weighted blend proportional to time differences of time-adjacent image portions to generate a view according to an embodiment consistent with the principles described herein. Herein, a 'weighted blend' is defined as sum or other combination of two variables (e.g., pixel values), where each variable is weighted according to a respective coefficient (e.g., the weight). For example, to generate VIEW 1, a target timestamp is determined for VIEW 1, which is 70 units of time in FIG. 6. A subset of time-adjacent image portions is identified from cache data entries based on the target timestamp, which are TILE 1A and TILE 1B in the example of FIG. 6. The weighted blend may be proportional to the time difference between the time-adjacent image portions (e.g., between TILE 1A and TILE 1B). A coefficient in the weighted blend corresponds to the time difference. For example, the blending operation may involve determining a time difference between the target timestamp (70) and the cache data entry timestamps adjacent to the target timestamp (e.g., timestamps 0 and 100). For example, VIEW 1 may have a time difference of 70 time units with respect to TILE 1A and a time difference of 30 time units with respect to TILE 1B. Thus, VIEW 1 is quantifiably closer to TILE 1B than to TILE 1A. Upon determining these time differences, VIEW 1 may be generated by performing a weighted blend proportional to the time differences to generate the first new view 606. This may involve performing a linear pixel blending that is weighted according to the time differences. As a result, the first new view 606 may appear more similar to the image portion in TILE 1B than to the image portion in TILE 1A.

According to an embodiment, a motion-based blend can be used to generate a new view according to an embodiment consistent with the principles described herein. For example, using motion estimation techniques, an optical flow between the image portion of the first tile 602 and the image portion of the second tile 604 may be determined. An optical flow is a set of data comprising vectors that express how features or image objects move from an initial frame to a subsequent frame. In this respect, the optical flow contains the velocities of different objects or pixel groupings from one frame to the next. The optical flow may be formatted as a matrix of vectors. Upon determining the optical flow between tiles, a new view may be generated based on blending these time-adjacent image portions using the optical flow.

Figure 9:
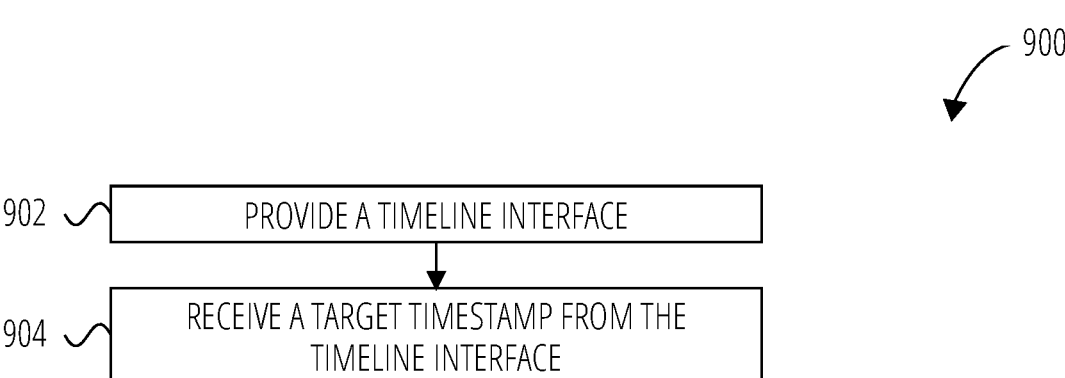
FIG. 9 illustrates a flowchart of a method for providing or using a user interface to control timeline scrubbing for a multiview video according to an embodiment consistent with the principles described herein.

FIG. 7 illustrates a flowchart of a first method 700 for generating a multiview video cache according to an embodiment consistent with the principles described herein. FIG. 8 illustrates a flowchart of a second method 800 for using information from a multiview video cache according to an embodiment consistent with the principles described herein. FIG. 9 illustrates a flowchart of a third method 900 for providing or using a user interface to control timeline scrubbing for a multiview video according to an embodiment consistent with the principles described herein.

The flowcharts of FIG. 7, FIG. 8, and FIG. 9, provide various examples of functionality that can be implemented by a computing device executing an instruction set. The flowcharts may also be viewed as depicting examples of elements of a computer-implemented method according to one or more embodiments. The flowcharts may also be viewed as depicting operations of a non-transitory, computer-readable storage medium storing executable instructions that, when executed by a processor circuit of a computer system, cause the computer system to perform operations for multiview video processing or conversion.

Referring first to FIG. 7, at block 702, the operations of the first method 700 can include receiving multiview video information comprising two-dimensional (2D) frames. According to an embodiment, each 2D frame corresponds to a respective view of a multiview video or multiview frame. Each multiview frame, and accordingly each corresponding 2D frame, can have an associated multiview video timestamp.

At block 704, the operations can include receiving a video timeline scrub resolution indicator. The scrub resolution indicator can be a preset value or can be a value specified by a user. The scrub resolution indicator can specify a resolution or granularity at which timeline scrubbing is available. Higher resolution scrubbing can include or use a larger or higher resolution cache for multiview video playback.

At block 706, the operations can include allocating a multiview video cache. Allocating a cache can include allocating a data store or data structure in computing device-resident or processor-resident memory. According to an embodiment, attributes such as size, location, or format, among others, can be defined at the time of cache allocation. A size of the cache can depend, for example, on the resolution indicator received at block 704.

At block 708, the operations can include selecting a cache timestamp interval that is based on the resolution indicator received at block 704. The cache timestamp interval can indicate a frequency at which cache data entries are populated throughout all or a portion of a multiview video. A lower interval corresponds to a higher frequency and corresponding higher resolution timeline scrubbing. According to an embodiment, the timestamp interval is greater than a timestamp unit interval. Cache data entries will correspond to non-time-adjacent multiview video timestamps when the timestamp interval is greater than a unit interval. According to an embodiment, the cache timestamp interval can be optimized automatically based on system resources or performance capabilities, or playback quality requirements (e.g., as specified by a user or user profile).

At block 710, the operations can include populating or generating a first cache data entry for a first timestamp of the multiview video. The first cache data entry can include a group of images, such as can be tiled in a macro-image or other image format. Tiles in the cache data entry can be copies or representations of some or all of the 2D frames of a multiview frame having the first timestamp. According to an embodiment, the tiles can be lower-resolution copies of the source images.

At block 712, the operations can include populating or generating a second cache data entry for a second timestamp of the multiview video. The second timestamp can be spaced in time from the first timestamp by the timestamp interval (e.g., selected at block 708). The second cache data entry can include a group of images, such as can be tiled in a macro-image or other image format. Tiles in the cache data entry can be copies or representations of some or all of the 2D frames of a multiview frame having the second timestamp.

FIG. 8 illustrates a flowchart of a second method 800 for using information from a multiview video cache according to an embodiment consistent with the principles described herein. At block 802, operations of the second method 800 can include determining a target timestamp for a particular multiview frame to render. According to an embodiment, the particular multiview frame to render can be based on a user input or indication, such as can be received by a user interface.

At block 804, the operations can include retrieving, from a multiview video cache, a pair of cache data entries corresponding to the target timestamp determined at block 802. According to an embodiment, first and second cache data entries of the pair comprise respective first and second image frame groups, wherein the first image frame group corresponds to a first multiview frame preceding the target timestamp and the second image frame group corresponds to a second multiview frame following the target timestamp. According to an embodiment, each image frame group includes a macro-image or collection of multiple images in one file or location. For example, the macro-image can be a tiled image.

At block 806, the operations can include generating views of the particular multiview frame using the pair of cache data entries. For example, block 806 can include using the first and second image frame groups from the cache. According to an embodiment, block 806 can include applying various techniques to blend or combine information from each of the cache data entries to generate a plurality of new views. For example, blending the information can include weighting an influence of each of the frames proportional to a time difference of each of the cache data entries relative to the target timestamp. According to an embodiment, generating the views of the particular multiview frame includes generating respective views using 2D frames from each of the first and second cache data entries that correspond to the same view direction.

At block 808, the operations can include rendering a multiview video for display using the generated views (e.g., at block 806) of the particular multiview frame. For example, block 808 can include providing the generated views to the graphics pipeline 212 for further processing and display using a multiview video display.

FIG. 9 illustrates a flowchart of a third method 900 for providing or using a user interface to control timeline scrubbing for a multiview video according to an embodiment consistent with the principles described herein. At block 902, the operations can include providing a timeline interface. The timeline interface can comprise a portion of a user interface. The timeline interface can provide a representation, such as a pictorial representation, of a timeline or duration of a multiview video. The timeline interface may include indicia of cache data entries at corresponding positions on the timeline interface. The indicia can indicate to a user specific seek points in a multiview video where playback latency is lowest.

At block 904, the operations can include receiving a target timestamp from the timeline interface. For example, the timeline interface can be configured to receive a user input. The user input can indicate a particular timestamp of the multiview video. Information about the target timestamp can be used by the system to trigger one or more other operations, such as according to the example of FIG. 8. For example, information about the target timestamp can be used at block 802.

The flowcharts of FIG. 7, FIG. 8, and FIG. 9 may illustrate various systems or methods of multiview video processing embodied as an instruction set that is stored in memory and executable by a processor circuit. If embodied in software, each block may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor circuit a computing device. The machine code may be converted from the source code, etc. If embodied in hardware, each block may represent a circuit or a number of interconnected circuits to implement the specified logical function(s).

Although the flowcharts show specific orders of execution, it is to be understood that the order of execution may differ from that which is depicted. For example, the order of execution of two or more blocks may be scrambled relative to the order shown. Also, two or more blocks shown may be executed concurrently or with partial concurrence. Further, in some embodiments, one or more of the blocks may be skipped or omitted or may be performed contemporaneously.

According to other embodiments of the principles described herein, configured to perform real-time multiview video conversion. According to various embodiments, multiview video conversion may be embodied in a processor-based system such as, for example, a computing device. In this respect, embodiments are directed to a system configured to perform the multiview video conversion where the system comprises a processor circuit or central processing unit (CPU) and a memory circuit. The memory circuit is configured to store a plurality of instructions, which, when executed by the processor circuit cause the processor circuit to perform various operations that carry out the multiview video conversion. For example, the various operations may include or use information from the multiview video cache 206. The plurality of instructions, which, when executed, may cause the processor circuit to generate cache data entries of the multiview video cache 206 corresponding to respective timestamps of the multiview video. According to some embodiments, the instructions may cause the processor circuit to generate and store, as the cache data entries, respective tiled images, and tiles of each tiled image correspond to respective copies of the 2D frames for different views for a corresponding timestamp.

FIG. 10 illustrates a schematic block diagram of a computing device 1000 configured to perform real-time multiview video conversion in an example, according to an embodiment consistent with the principles described herein. The computing device 1000 may include a system of components that carry out various computing operations for a user of the computing device 1000. The computing device 1000 may be a laptop, tablet, smart phone, touch screen system, intelligent display system, other client device, server, or other computing device. The computing device 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing device 1000 to communicate with each other. While the components of the computing device 1000 are shown to be contained within the computing device 1000, it should be appreciated that at least some of the components may couple to the computing device 1000 through an external connection. For example, components may externally plug into or otherwise connect with the computing device 1000 via external ports, sockets, plugs, connectors, or wireless links.

A processor 1003 may include a processor circuit such as a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data or generate data. For example, the processor(s) 1003 may receive input data (e.g., an image), process the input data according to an instruction set, and generate output data (e.g., a processed image). As another example, the processor(s) 1003 may receive instructions and generate new instructions for subsequent execution. The processor 1003 may comprise the hardware to implement a graphics pipeline (e.g., the graphics pipeline 134 of FIG. 2) to render video, images, or frames generated by applications. For example, the processor(s) 1003 may comprise one or more GPU cores, vector processors, scaler processes, decoders, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003. Images (e.g., still images, video frames) may be stored or loaded in memory 1006 for subsequent access.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions. According to various embodiments, the multiview video cache 206 can be implemented using volatile, nonvolatile, or a combination of volatile and nonvolatile memories.

The memory 1006 may refer to a combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing device 1000, it should be appreciated that the memory 1006 may be embedded or otherwise integrated, at least partially, into one or more components. For example, the processor(s) 1003 may include onboard memory registers or cache to perform processing operations.

According to various embodiments, the memory 1006 is configured to store a plurality of instructions that, when executed by the processor 1003, cause the processor to receive a target timestamp for a particular multiview frame to render and to retrieve, from a cache, a pair of cache data entries corresponding to the target timestamp. A first and second cache data entries of the pair comprise respective first and second image frame groups. The first image frame group corresponds to a first multiview frame preceding the target timestamp and the second image frame group corresponds to a second multiview frame following the target timestamp, according to various embodiments. When executed by the processor 1003, the plurality of instructions stored in the memory 1006 further cause the processor 1003 to generate a multiview frame using information from the first and second image frame groups. In various embodiments, the multiview frame comprises a portion of a multiview video configured to be rendered on a multiview display.

In some embodiments, the memory 1006 further stores instructions that, when executed, cause the processor 1003 to generate a user interface that is configured to be displayed on the multiview display. In addition, the stored instructions may cause the processor 1003 to generate a user interface that is configured to be displayed on the multiview display, when the instructions are executed. In some embodiments, the memory 1006 may also store instructions that cause the processor 1003 to generate the multiview frame by blending information from corresponding portions of the first and second image frame groups, in some embodiments.

Also illustrated in FIG. 10 are I/O component(s) 1009 that may include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

One type of I/O component 1009 is a display 1012. The display 1012 may include a multiview display (e.g., multiview display 160), a multiview display, a multiview display combined with a 2D display, or any other display that presents graphic content. A capacitive touch screen layer serving as an I/O component 1009 may be layered within the display to allow a user to provide input while contemporaneously perceiving visual output. The processor(s) 1003 may generate data that is formatted as an image or frame for presentation on the display 1012. The processor(s) 1003 may execute instructions to render the image or frame on the display 1012 for the user. A camera I/O component 1009, may be used for a video capture process that captures video that may be converted into multiview video.

The bus 1015 illustrated in FIG. 10 may facilitate communication of instructions and data between the processor(s) 1003, the memory 1006, the I/O component(s) 1009, the display 1012, and any other components of the computing device 1000. The bus 1015 may include address translators, address decoders, fabric, conductive traces, conductive wires, ports, plugs, sockets, and other connectors to allow for the communication of data and instructions.

According to various embodiments, the instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the computing device 1000, such as scheduling tasks, controlling I/O components 1009, providing access to hardware resources, managing power, and supporting applications 1034.

An application(s) 1034 illustrated in FIG. 10 may execute on the operating system 1031 and may gain access to hardware resources of the computing device 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing device 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java®, Swift, JavaScript®, Perl, PHP, Visual Basic®, Python®, Ruby, Go, or other programming languages. The application(s) 1034 may be compiled by a compiler into object code or interpreted by an interpreter for execution by the processor(s) 1003. Various embodiments discussed herein may be implemented as at least part of the application 1034.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the computing device 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the computing device 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The computer-readable storage medium may or may not be part of the computing device 1000. The instructions may include, for example, statements, code, or declarations that can be fetched from the computer-readable medium and executed by processing circuitry (e.g., the processor(s) 1003). In the context of the present disclosure, a 'computer-readable medium' may be any medium that can contain, store, or maintain the instructions described herein for use by or in connection with an instruction execution system, such as, for example, the computing device 1000.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The computing device 1000 may perform any of the operations or implement the functionality described above. For example, the flowchart and process flows discussed above may be performed by the computing device 1000 that executes instructions and processes data. While the computing device 1000 is shown as a single device, embodiments are not so limited. In some embodiments, the computing device 1000 may offload processing of instructions in a distributed manner such that a plurality of computing devices 1000 operate together to execute instructions that may be stored or loaded in a distributed arrangement of computing components. For example, at least some instructions or data may be stored, loaded, or executed in a cloud-based system that operates in conjunction with the computing device 1000.

Thus, there have been described examples and embodiments of computer-implemented method of multiview video rendering, a computer-implemented method of preparing a multiview video cache, and a system configured to perform real-time multiview video conversion that employs the multiview video cache. The multiview video cache, in turn, can include at least a pair of cache data entries corresponding to a target timestamp, and first and second cache data entries of the pair can include respective first and second image frame groups. The first image frame group can correspond to a first multiview frame preceding the target timestamp and the second image frame group can correspond to a second multiview frame following the target timestamp. Views of a particular multiview frame, corresponding to the target timestamp, can be generated using information from the first and second image frame groups from the cache. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of multiview video rendering, the method comprising:
   receiving video information having a plurality of multiview frames using a computing device, each multiview frame of the multiview frame plurality corresponding to a respective multiview video timestamp and comprising a plurality of two-dimensional (2D) frames corresponding to different views of a scene within the multiview frame;
   determining a target timestamp for a particular multiview frame to be rendered based on a user input;
   retrieving from a multiview video cache a pair of cache data entries corresponding to the target timestamp, a first cache data entry of the pair of cache data entries comprising a respective first image frame group corresponding to a first multiview frame preceding the target timestamp and a second cache data entry of the pair of cache data entries comprising a respective second image frame group corresponding to a second multiview frame following the target timestamp, wherein each cache data entry comprises a tiled image and each tile in the tiled image corresponds to a different 2D frame of a respective multiview frame;
   generating views of the particular multiview frame using the first and second image frame groups from the cache; and
   rendering a multiview video for display by the computing device, the multiview video comprising the views of the particular multiview frame.

2. The computer-implemented method of claim 1, further comprising generating the cache with cache data entries corresponding to respective different timestamps.

3. The computer-implemented method of claim 2, wherein the tiles in a tiled image comprise a lower-resolution copy of a corresponding 2D frame from the video information.

4. The computer-implemented method of claim 2, wherein the cache data entries in the cache have non-time-adjacent timestamps.

5. The computer-implemented method of claim 2, wherein a number of the cache data entries in the cache is based on a timeline scrubbing resolution.

6. The computer-implemented method of claim 2, wherein generating the cache includes using 2D frames corresponding to fewer than all of the multiview frames of the video information.

7. The computer-implemented method of claim 1, comprising generating the cache with cache data entries corresponding to respective different timestamps, and at least one of the cache data entries comprises an image frame group representing fewer than all of the views of a corresponding multiview frame.

8. The computer-implemented method of claim 1, wherein generating views of the particular multiview frame includes using a virtual camera.

9. The computer-implemented method of claim 1, wherein generating the views of the particular multiview frame includes generating a respective view using 2D frames from each of the first and second cache data entries that correspond to the particular multiview frame.

10. The computer-implemented method of claim 9, wherein generating the respective view comprises blending information from the 2D frames from each of the first and second cache data entries.

11. The computer-implemented method of claim 10, wherein blending the information includes weighting an influence of each of the 2D frames proportional to a time difference of each of the cache data entries relative to the target timestamp.

12. The computer-implemented method of claim 1, wherein retrieving the pair of cache data entries from the cache includes identifying two cache data entries from the cache having timestamps that are nearest in time to the target timestamp.

13. A computer-implemented method of preparing a multiview video cache, the method comprising:

receiving multiview video information comprising two-dimensional (2D) frames by a computing device, each 2D frame corresponding to a respective view of a multiview video and corresponding to a multiview video timestamp;

populating the cache with cache data entries corresponding to respective different multiview video timestamps, wherein each cache data entry comprises copies of the 2D frames for a particular respective timestamp; and generating a first cache data entry of the cache corresponding to a first timestamp, wherein the first cache data entry comprises a tiled image, and tiles of the tiled image correspond to respective ones of the copies of the 2D frames for the first timestamp.

14. The computer-implemented method of claim 13, wherein the cache data entries correspond to non-time-adjacent multiview video timestamps.

15. The computer-implemented method of claim 13, wherein at least one of the cache data entries comprises fewer than all of the 2D frames from the video information for a particular timestamp.

16. The computer-implemented method of claim 13, wherein the tiles are lower-resolution copies of the 2D frames for the first timestamp.

17. A system configured to perform real-time multiview video conversion, the system comprising:

a processor circuit; and a memory that stores a plurality of instructions that, when executed by the processor circuit, cause the processor circuit to:

receive a target timestamp for a particular multiview frame to render;

retrieve, from a cache, a pair of cache data entries corresponding to the target timestamp, first and second cache data entries of the pair of cache data entries comprise respective first and second image frame groups, the first image frame group corresponds to a first multiview frame preceding the target timestamp and the second image frame group corresponds to a second multiview frame following the target time-stamp; and generate a multiview frame using information from the first and second image frame groups by blending the information from the first and second image frame groups, wherein the blending includes weighting an influence of each of the image frame groups proportional to a time difference of each of the cache data entries relative to the target timestamp, wherein the multiview frame comprises a portion of a multiview video configured to be rendered on a multiview display.

18. The system of claim 17, wherein the memory stores instructions that cause the processor circuit to:

generate a user interface that is configured to be displayed on the multiview display; and receive user input via the user interface, the user input indicating the target timestamp.

19. The system of claim 17, wherein the memory stores instructions that cause the processor circuit to generate the multiview frame by blending information from corresponding portions of the first and second image frame groups.

* * * * *